Patented May 28, 1940

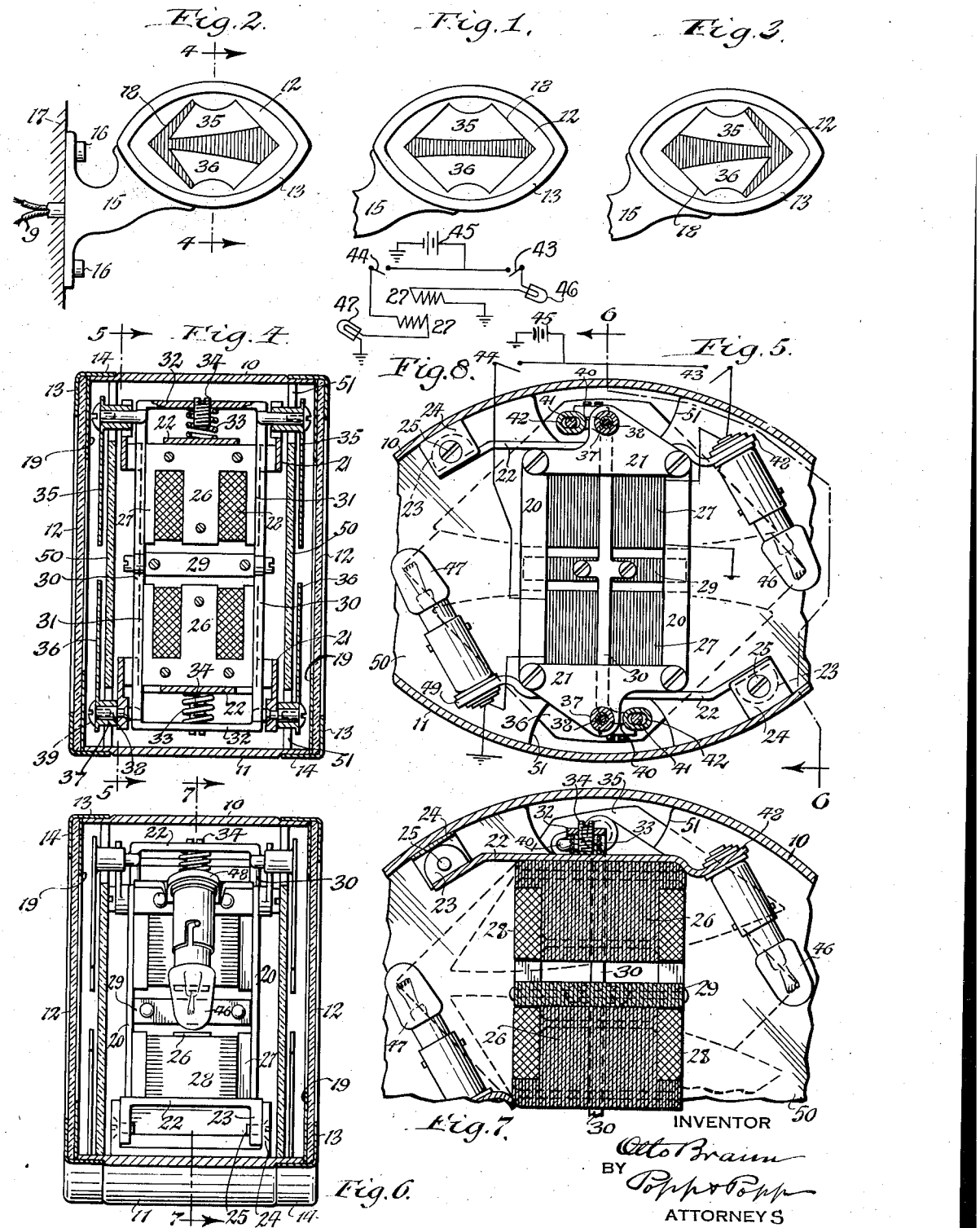

2,202,571

UNITED STATES PATENT OFFICE 2,202,571

DIRECTION SIGNAL

Otto Braun, Buffalo, N. Y.

Application February 27, 1939, Serial No. 258,656

1 Claim. (Cl. 177—327)

This invention relates to a direction signal which is more particularly designed for use on automobiles and other vehicles for the purpose of enabling the driver to indicate the direction in which he intends to steer from his course, although this signal is also capable of use in other installations where similar indications are required.

In general this direction signal comprises a casing having a sight area, window or field which is preferably of symmetrical contour and at least one pair of transforming shutters or vanes which are adapted to be moved relative to said sight area for the purpose of producing a figure or image which is neutral and does not definitely indicate any direction but can be moved either one way or in another way for the purpose of producing a figure, such as an arrow, which will point either to the right or to the left depending upon which way the driver or operator of a vehicle intends to turn from the road on which he is traveling.

It is the object of this invention to produce a direction signal of this type which is very simple and compact in construction, efficient in operation, and which is also very neat in appearance so that the same will not detract from the automobile upon which the same is mounted.

In the accompanying drawing:

Fig. 1 is a face view of a direction signal embodying my invention viewed from one side thereof and showing the parts in a neutral position without indicating any particular direction.

Fig. 2 is a similar view showing the relatively movable parts shifted into a position which will produce an arrow pointing toward the left.

Fig. 3 is a similar view showing the movable parts of the signal shifted into a position which will produce the appearance of an arrow pointing to the right.

Fig. 4 is a vertical longitudinal section, on an enlarged scale, taken on line 4—4, Fig. 2.

Fig. 5 is a fragmentary vertical transverse section taken on the correspondingly numbered line in Fig. 4.

Fig. 6 is a vertical longitudinal section taken on line 6—6, Fig. 5.

Fig. 7 is a fragmentary transverse section taken on line 7—7, Fig. 6.

Fig. 8 is a diagram of the electric wiring in this direction signal.

In the following description similar characters of reference indicate like parts in the several figures of the drawing:

The working parts of this signal are enclosed in a casing which is generally of almond shape and comprises upper and lower curved metal walls 10 and 11 which are connected at their opposite ends, upright transparent window panes, panels or lenses 12, 12 of almond shape extending transversely across the opposite edges of the top and bottom walls of the casing, and two bezels or retaining rims each of which is L-shaped in cross section and has a vertical flange 13 bearing against the outer side of the edge portion of one of the panes 12 and a horizontal flange 14 which is secured to the periphery of the adjacent edges of the upper and lower walls of the casing.

Any suitable means may be provided for mounting this casing on a support, for example, an arm or bracket 15 which is secured at its front end to the underside of the lower casing wall 11 adjacent to one end thereof while the rear end of this arm is secured by means of bolts 16 to a wall or pillar 17 forming part of the automobile which carries the signal.

Each of the panes or panels 12 is preferably constructed of white glass which ordinarily would be transparent over its entire area but means are associated with this pane so that the marginal part of the same is opaque and a sight area 18 is produced in the central part thereof which is transparent and has a contour which is of symmetrical form, such as the substantial diamond shape illustrated in Figs. 1, 2 and 3, having angular ends of like form pointing toward the right and toward the left so as to give a neutral or indistinguishable indication which does not point definitely one way or the other. The marginal part of each of the panes 12 may be rendered opaque in any suitable manner, for instance, by applying a non-transparent paint or coating 19 on the border portion of the inner side of this pane, or by means of a correspondingly formed sheet of opaque paper or mask of metal applied in this location to the pane.

Within the casing is mounted a frame which carries the several working parts of the apparatus, which frame may be variously constructed but in its preferred form comprises two pairs of spaced upright bars 20 arranged on the longitudinally opposite sides of the frame, upper and lower cross bars 21 connecting the corresponding upper and lower ends of each pair of bars 20, and upper and lower horizontal plates 22 arranged transversely between the corresponding upper and lower transverse bars 21 and each horizontal plate being provided at one end with an outwardly projecting attaching lug 23, the lugs of the two horizontal plates 22 being arranged adjacent to diagonally opposite corners of the frame. On diagonally opposite parts of the upper and lower walls 10 and 11 of the casing are arranged inwardly projecting brackets 24 to which the diagonally opposite lugs 23 of the frame are detachably connected by means of screws 25. When mounting the frame on the casing the frame is introduced lengthwise between the walls of the casing while the panes are absent and at which time the frame is turned a sufficient extent in the proper direction so that the lugs 23 and the adjacent parts of the frame plates 22 clear the brackets 24 and the attaching lugs 23 are in line with the inner sides of the brackets 24, after which the frame is turned for bringing the lugs 23 behind the brackets and permit these members to be connected by the screws 25. A reversal of this operation will disassemble the parts. By means of this organization it is possible to make the apparatus compact as a whole and still permit of easily assembling or disassembling the same for inspection, adjustment and repairs.

Within the frame is mounted a pair of electromagnets, one of which is arranged in the upper part of the frame and the other in the lower part of the same and the inner parts of these electromagnets being spaced apart for receiving an armature which is adapted to be acted upon by both of the electromagnets. In the preferred construction each of these electromagnets is provided with a multiple pole piece having a central core 26 and side wings 27, the poles of which are arranged at the inner ends thereof and face the corresponding poles of the other electromagnet, and a winding or coil 28 surrounding the core 26 of the pole within the wings thereof. The outer ends of the two pole pieces may be connected with the supporting frame in any suitable manner, for instance, by soldering the outer ends thereof to the horizontal plates 22.

The numeral 29 represents an armature which is arranged between the opposing poles of the two electromagnets and is adapted to stand midway between the same when both electromagnets are deenergized but when one or the other of these electromagnets is energized by the passage of an electric current through its coil or winding then the armature will be moved toward the pole of the respective electromagnet. In its reciprocating movement between the opposing poles of the two electromagnets the armature is guided vertically by connecting opposite transverse ends thereof with two upright shifting rods or bars 30 each of which is guided adjacent to its upper and lower ends in guideways 31 on the parts of the supporting frame and the wings of the electromagnets.

At their corresponding upper and lower ends the shifting rods 30 are connected by upper and lower horizontal bars 32 extending lengthwise across the coresponding ends of the supporting frame whereby these rods are compelled to move as a unit and the armature is maintained in parallelism with the poles of both electromagnets during its vertically reciprocating movement. When both electromagnets are de-energized the armature is yieldingly held in its central position between the two poles of these magnets by means of springs 33 each of which is interposed between the inner side of the respective longitudinal bar 32 and the adjacent horizontal plate 22, as shown in Fig. 4, but when either of the electromagnets is energized and the armature is attracted by the respective magnet, then one of the springs 33 is compressed and the other spring is eased off, and when the current is again cut off from the respective magnet the spring which has been additionally strained by the attraction of the armature will again return the armature to its central position in the space between the poles of the magnets.

Means are provided whereby the movement of the armature toward the poles of the electromagnets is limited, this being preferably effected by screws 34 mounted on the longitudinal bars 32 and adapted to engage with the horizontal plates 22 of the frame, these screws permitting the extent of movement of this armature toward one or the other of the poles of these magnets to be adjusted.

The numerals 35 and 36 represent a pair of upper and lower transforming shutters or vanes which are arranged between the inner side of each of the sight panes 12 and the adjacent part of the frame which carries the working mechanism of the signal. The upper shutter of each pair is generally of triangular form and arranged adjacent to the upper part of the sight area 18 of the adjacent pane 12 and the lower shutter 36 of this pair is correspondingly arranged adjacent to the lower part of this sight area. Each of these panes is pivoted at its outer edge midway between its opposite ends on the adjacent part of the magnet supporting frame so that this shutter or vane can be turned in a plane extending crosswise of the casing or parallel with the respective casing pane 12. The preferred means for thus pivoting each of the transforming shutters on the electromagnet frame consists of a tubular hub 37 projecting inwardly from the shutter and turning on a pivot pin 38 projecting outwardly from the adjacent frame cross bar 21 and a retaining screw 39 secured to the pin 38 and bearing against the outer side of the shutter, as best shown in the lower part of Fig. 4.

The several shutters are actuated simultaneously by movement derived from the armature 29, the means for transmitting movement from the armature to the shutters including shifting arms 40 projecting laterally from opposite ends of each shifting rod 30 and each provided with a horizontal slot 42 which receives a crank pin 41 mounted on the adjacent part of the respective shutter on one side of its axis so that this crank pin is in effect eccentric relative to the axis of this shutter, as best shown in Fig. 5, and the upper part of Fig. 4. The crank pin 41 of one of the shutters of one pair is arranged on one side of its axis while the crank pin of the companion shutter is arranged on the diagonally opposite side of its axis, which arrangement of these crank pins causes two of the corresponding ends of each pair of shutters to move away from each other and the other corresponding ends of the same shutters to approach each other upon moving the shifting rods 30 in one direction from their central position, but when moving these shifting rods in the opposite direction from their central position the relative movement of the shutters of each pair will be reversed, and when the shutters of each pair are in their central position the corresponding opposite ends of the same will be spaced apart equal distances.

It follows from this construction that when the armature and the shifting rods are in their central position, the transforming shutters of each pair will also be in their central position in which opposite ends thereof are spaced apart like distances, thereby defining a figure in cooperation with the sight area of the adjacent casing pane 12 which is of symmetrical contour and does not distinguishably point in either direction. Such a position is indicated in Fig. 1 in which the figure defined by the opposing edges of the cooperating shuters 35, 36 and the sight opening 18 of the adjacent pane has the general form of a horizontal dash which is symmetrical and therefore does not distinguishably point either toward the right or to the left.

When it is desired to give an indication that the driver intends to turn toward the left from the course he has been pursuing, the lower electromagnet is energized so as to draw the armature 29 downwardly whereby the two shutters of each pair are turned so that the left ends thereof are brought closer together and their right ends are separated farther, whereby the opposing left hand edge portions of these shutters in cooperation with the left hand edge portion of the sight area in the transparent respective pane 12 will produce the figure of an arrow which points toward the left, as shown by full lines in Fig. 2 and by dotted lines in Fig. 7. Similarly the lifting of the armature 29 from its central or neutral position to its uppermost position by energizing the upper electromagnet will cause the shutters of each pair to be turned in a direction which will cause their opposing edge portions in cooperation with the edges of the sight area of the respective pane 12 to produce a figure which simulates an arrow pointing toward the right, as shown in Fig. 3.

For the purpose of energizing the electromagnets in order to raise or lower the armature and turn the shutters of both pairs accordingly, right and left hand switches 43, 44 are employed, the former being arranged in an electric circuit which includes the coil of the upper electromagnet and an electric source such as a battery 45, while the latter is arranged in an electric circuit which includes the coil of the lower electromagnet and said electric source so that when the switch 43 is closed each pair of shutters will be operated to indicate a right hand turn and closure of the switch 44 will produce a shifting of each pair of shutters to indicate a left hand turn.

In addition to shifting the pairs of shutters or vanes so as to produce representations of arrows which point either to the right or to the left, means are provided for illuminating the interior of the enclosing casing in accordance with the direction in which the shutters have been turned for producing an arrow. It is preferable to employ for this purpose electric lamps 46 and 47 which are arranged in the right and left hand portions of the casing and mounted on supporting arms 48, 49 which are formed on the adjacent end portions of the upper and lower horizontal frame plates 22. The right hand lamp 46 is included in the circuit of the upper electromagnet and the right hand switch 43 and the left hand lamp 47 is included in the circuit of the lower electromagnet and the left hand switch 44 so that when the operator closes the right hand switch 43, each pair of shutter plates when forming an arrow which points to the right will be illuminated at the head of this arrow by the lighting of the right hand lamp and when the the left hand switch is closed for causing each pair of shutter plates to form an arrow which points to the left, the head of this arrow will be similarly illuminated by the lighting of the left hand lamp, but when both switches are open, such as occurs when the shutters are in their central or neutral position, as shown in Figs. 1 and 5, then both lamps will be extinguished and no direction indication will be given. In the preferred embodiment of these improvements the arm 15 of the bracket which supports the casing of the signal on the body of an automobile is made of hollow or tubular form so as to serve as a conduit for the wires 9 whereby the electric current is supplied to the electromagnets and the incandescent lamp 5, as shown in Fig. 2.

For the purpose of concealing the mechanism within the casing with the exception of the shutters and thus enable the shuters to produce clearly defined direction indications in cooperation with the sight area of the outer transparent panes or panels 12, a screen is arranged between the inner side of each pair of shutters and the adjacent part of the operating mechanism, which screen preferably consists of a plate or panel 50 of glass which may be colored red or otherwise so as to defuse the light rays from the lamps which pass therethrough and thus define the image of the arrow which is formed by the movement of each pair of shutters and enable the same to be more clearly visible. Each of these screens is preferably of the same general contour as the inner side of the upper and lower walls of the casing so as to fit against the same and avoid displacement and at its upper and lower edges each of these screens is provided with a notch 51 which receives the means whereby the respective shutters are mounted on the adjacent part of the main frame and also the adjacent part of the means whereby motion is transmitted from the armature 29 to said shutters.

Owing to the casing being provided with windows on its opposite sides and two sets of indicating members moved relative to the sight areas of these windows which operate simultaneously, the direction indication produced by the operation of this mechanism is visible from opposite sides of the casing. This enables the signal to be observed by persons in front as well as those in rear of the car and thereby enables all persons in the vicinity of the car to note the direction in which the driver of the car intends to turn and thus increases safety of travel on the highways.

As a whole this direction signal consists of relatively few parts considering the various functions which are performed, which parts are of simple construction and capable of being produced at low cost. The organization of this signal is also such that the same can be readily assembled in the course of its manufacture and also disassembled when required. Furthermore this signal has no delicate parts which are liable to get out of order and all of the internal working parts are completely enclosed by the casing so that the operation of the mechanism is not liable to be affected by weather conditions. The signal will therefore remain in an operative condition and enable the driver to give the required signal preparatory to making a turn from the road in either direction.

I claim as my invention:

A direction signal comprising a casing provided on its opposite sides with sight areas, a frame arranged within said casing, pairs of shutters arranged on opposite sides of said frame, the members of each pair having their opposing free front ends of a contour for forming a direction indicator in connection with the form of the adjacent part of a sight area and the rear ends of said shutters being pivoted on said frame on opposite sides of the central part of the respective sight area, cranks on said shutters, the crank of a shutter of one pair being arranged laterally in one direction from a line extending through the pivots of the respective pair of shutters and the crank of the companion shutter being arranged laterally in the opposite direction from this line, vertical shifting rods movable vertically on opposite sides of the frame and each provided at its opposite ends with slotted arms which receive the cranks of a pair of shutters, one of said arms extending in one direction from said rod and the other arm extending in the opposite direction from said rod, an armature arranged between said shifting rods and connected at its opposite ends therewith, electromagnets mounted on said frame between said vertical rods and having their poles facing opposite sides of said armature and adapted to move said armature and the parts connected therewith upon energizing one or the other of said electromagnets, horizontal connecting bars arranged across opposite ends of the frame and each connected at its opposite ends with the corresponding ends of said shifting rods, and centering springs having their inner ends engaging with opposite ends of said frame and their outer ends engaging the central parts of said connecting bars.

OTTO BRAUN.